(12) United States Patent
Talt et al.

(10) Patent No.: US 9,392,767 B2
(45) Date of Patent: Jul. 19, 2016

(54) COMPOSTABLE ANIMAL FEED BOWL

(71) Applicants: Mark Kevin Talt, San Marino, CA (US); Aldie E. Johnson, III, Pasadena, CA (US)

(72) Inventors: Mark Kevin Talt, San Marino, CA (US); Aldie E. Johnson, III, Pasadena, CA (US)

( * ) Notice: Subject to any disclaimer, the term of this patent is extended or adjusted under 35 U.S.C. 154(b) by 0 days.

(21) Appl. No.: 14/309,687

(22) Filed: Jun. 19, 2014

(65) Prior Publication Data

US 2015/0059651 A1    Mar. 5, 2015

Related U.S. Application Data

(60) Provisional application No. 61/872,113, filed on Aug. 30, 2013.

(51) Int. Cl.
*A01K 5/00* (2006.01)
*A01K 5/01* (2006.01)
*A01K 7/00* (2006.01)

(52) U.S. Cl.
CPC .............. *A01K 5/0121* (2013.01); *A01K 5/0128* (2013.01); *A01K 7/00* (2013.01)

(58) Field of Classification Search
CPC .......................... A01K 5/0114; A01K 5/0121
See application file for complete search history.

(56) References Cited

U.S. PATENT DOCUMENTS

| | | | | |
|---|---|---|---|---|
| 330,785 | A | | 11/1885 | Hussey |
| 3,527,192 | A | * | 9/1970 | Ferrara ................. A01K 5/0128 119/61.5 |
| 3,698,594 | A | * | 10/1972 | Boehlert .................. 220/495.01 |
| 4,800,845 | A | * | 1/1989 | Budd ............................ 119/61.5 |
| 4,803,954 | A | * | 2/1989 | Welch et al. ................ 119/61.53 |
| D330,785 | S | * | 11/1992 | Jordan .......................... D30/129 |
| 5,345,784 | A | | 9/1994 | Bazemore et al. |
| 5,445,110 | A | | 8/1995 | Birnie et al. |
| 5,709,168 | A | | 1/1998 | Walker et al. |
| 5,782,374 | A | * | 7/1998 | Walker ....................... 220/23.87 |
| 6,089,187 | A | | 7/2000 | Gaspary |
| 6,672,248 | B2 | * | 1/2004 | Bourigault ...................... 119/63 |
| 6,840,191 | B2 | * | 1/2005 | Gaspary et al. .............. 119/61.5 |
| 7,204,202 | B2 | * | 4/2007 | Behun et al. ................. 119/61.5 |
| D564,138 | S | * | 3/2008 | Dunn et al. ................... D30/129 |
| 7,931,950 | B2 | | 4/2011 | Kim et al. |
| 8,464,658 | B2 | * | 6/2013 | Lanter ......................... 119/61.52 |
| D715,594 | S | * | 10/2014 | Norland et al. ................ D7/545 |
| 2005/0039689 | A1 | | 2/2005 | Mossmer |
| 2006/0027176 | A1 | * | 2/2006 | McQuade ............ A01K 5/0128 119/61.5 |

FOREIGN PATENT DOCUMENTS

| | | |
|---|---|---|
| EP | 0857419 A2 | 8/1998 |
| EP | 1734810 B1 | 12/2006 |
| WO | 2007019542 A2 | 2/2007 |

OTHER PUBLICATIONS

Sain, Mohini; Alemdar Ayse; "Biodegradable Nanocomposites From Wheat Straw"; Center for Biocomposites and Biomaterials Processing, Faculty of Forestry, University of Toronto, Toronto, ON, Canada.

* cited by examiner

*Primary Examiner* — Kristen C Hayes
(74) *Attorney, Agent, or Firm* — Jeffrey G. Sheldon; Leech Tishman; Fuscaldo & Lampl

(57) ABSTRACT

An insert for use with animal feed or water containers has a bowl shaped body, a wide rim so the insert can be supported by the container, and at least one lifting tab extending from the rim by at least 0.5 inch.

30 Claims, 3 Drawing Sheets

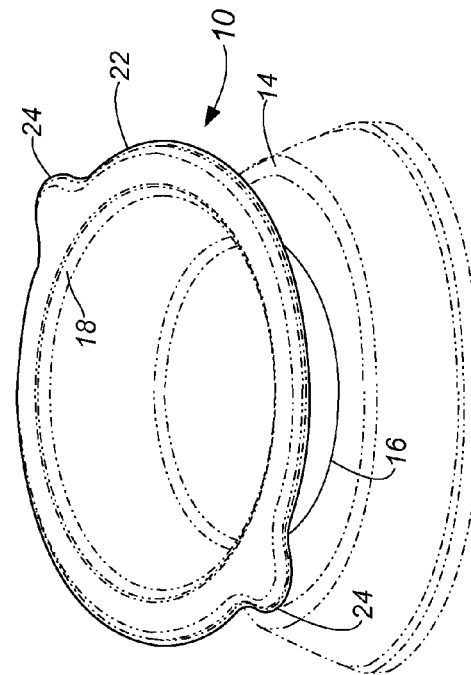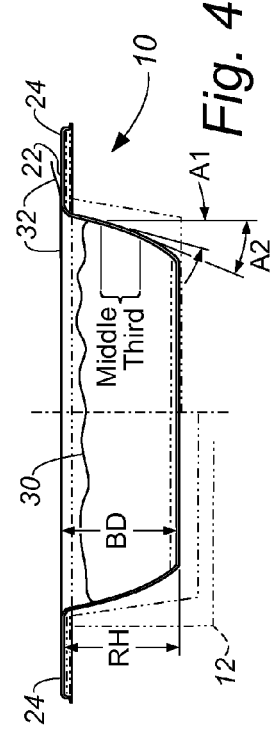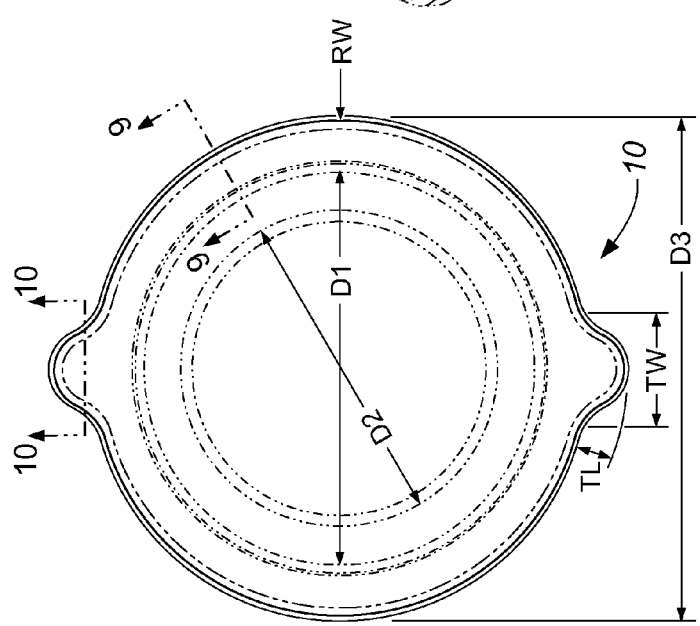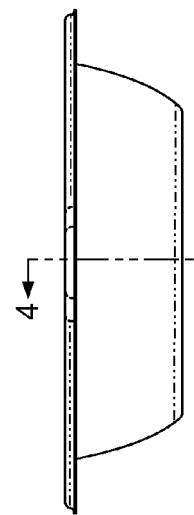

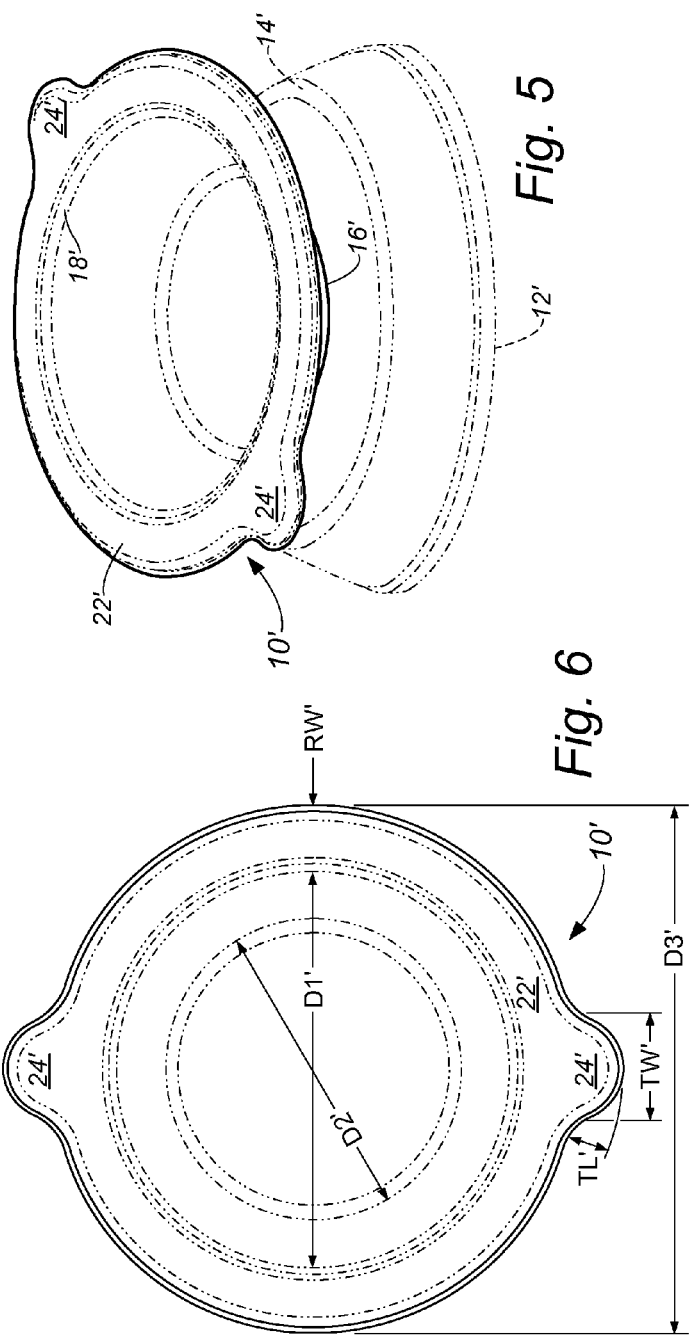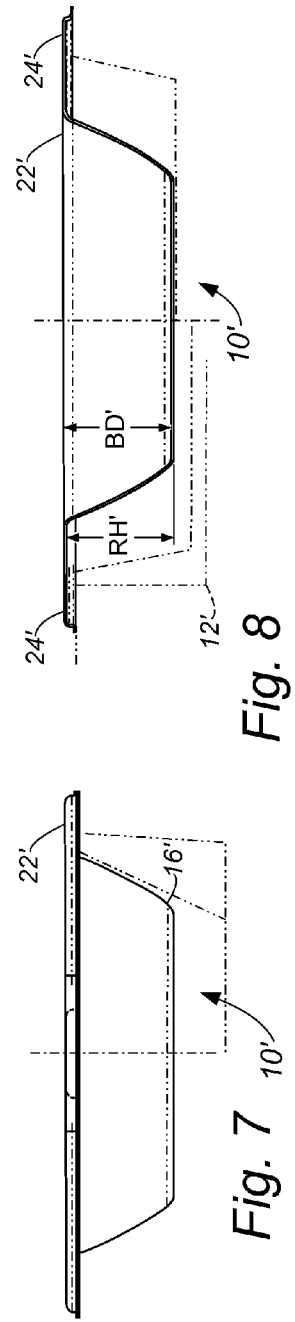

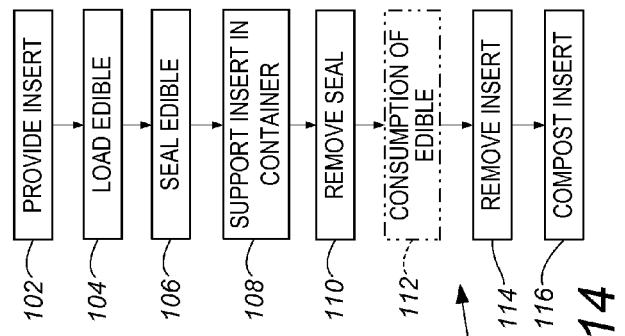
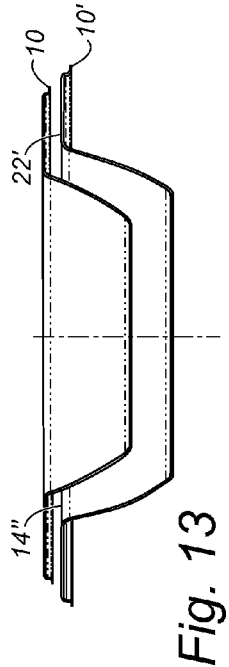
Fig. 14
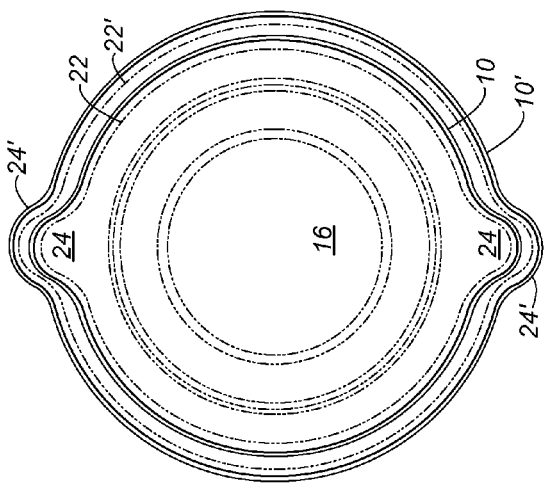
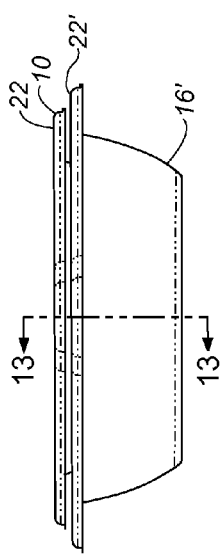

COMPOSTABLE ANIMAL FEED BOWL

CROSS-REFERENCE TO RELATED APPLICATION

This application claims the benefit of provisional U.S. Application Ser. No. 61/872,113, entitled "COMPOSTABLE ANIMAL FEED BOWL," filed Aug. 30, 2013, which is incorporated herein by reference in its entirety for all purposes.

BACKGROUND

A challenge for owners of pets is cleaning out feed and water bowls. Another problem is having a feed or water bowl available when traveling. Also desirable by many pet owners is an environmentally responsible container that is safe for the environment. Thus there is a need for an easily transportable, environmentally safe, discardable pet bowl. Many pet owners are increasingly conscientious about the health of their pets and the quality of the pet food they provide and desire to provide clean and uncontaminated utensils and sanitary conditions in which to feed their animals.

SUMMARY

The present invention is directed to an insert for feed and watering containers and a stand alone feed or watering bowl that meets these needs. An insert according to the present invention can be used with an animal feed or watering container that has an upper edge. The insert comprises a bowl-shaped body having an open top, with an inside diameter from about 3.5 inches to about 8 inches. The body has a rim around at least a sufficient portion of the open top to support the insert on the upper edge of the animal container. The ratio of rim width to the inside diameter of the insert is at least 1:30. There is at least one tab extending from the rim by at least 0.5 inch for lifting the insert from the container. The insert preferably is made of a compostable material. The insert can be used as a stand alone bowl.

In one aspect of the present invention, the insert includes a bowl-shaped body having an open top; an outwardly projecting rim around at least a sufficient portion of the open top for supporting the insert on the upper edge of the animal container; and at least one tab extending from the rim for lifting the insert from the container, the insert including a compostable material.

Preferably the width of the rim is between 0.25 inch and 0.75 inch, being more preferably approximately 0.6 inch.

Preferably there are two of the tabs, diametrically opposed. Preferably each of the tabs has a width at the rim that is at least 0.4 inch, being more preferably between 0.5 and 1.5 inches. Further, it is preferred that the length of each tab is between 0.25 inch and 0.75 inch.

Preferably the rim extends completely around the entire top of the insert. Preferably an upper third-portion of the body has a side inclination of at least 70 degrees from vertical, a middle third portion of the body having a side inclination of between 15 degrees and 45 degrees from vertical for enhanced structural integrity of the body. It is further preferred that a lip projects downwardly, extending fully around an outer perimeter of the insert for strengthening the rim and the tab, the lip being spaced outwardly from the bowl-shaped body by at least 0.2 inch beyond a clearance diameter surrounding the bowl-shaped body for projecting below a circular container upper edge. Preferably the lip projects downwardly at least 0.06 inch below the rim; further, an outwardly projecting flange preferably extends fully around a bottom extremity of the lip for strengthening the lip. The flange can have a width of between 0.04 inch and 0.08 inch.

The insert can further include an edible filling, such as pet food, within the body, and a removable cover sealingly affixed to the rim for preserving the filling against contamination.

An animal feed or watering container having an upper edge can be combined with the inventive insert being in the container, the upper edge of the container supporting the rim of the insert.

In another aspect of the present invention, for use with an animal feed or watering container having an upper edge, an insert includes the bowl-shaped body having a rim around its open top for at least a sufficient portion of the open top for supporting the insert on the upper edge of the animal container, the width of the rim being at least 0.25 inches and the diameter of the top being between 3.5 inches and 8.0 inches; and at least one tab having a length extending from the rim of at least 0.2 inch for lifting the insert from the container, the insert is made of a compostable material.

In a further aspect of the present invention, an animal feed or watering container includes a bowl-shaped body having an open top having an inside diameter of at least 3 inches and a rim around the open top for supporting an insert on the rim, the rim having a rim width of at least $\frac{1}{30}^{th}$ of the inside diameter; and at least one tab extending from the rim by at least 0.2 inch for lifting the container, the container being made of a compostable material.

In yet another aspect of the present invention, a method of providing food or liquid to an animal includes the steps of placing the insert of claim 1 in an animal feed or watering container with the insert supported by the container by the rim of the insert; placing food or liquid in the insert; and after the step of placing the food or liquid into the insert, removing the insert from the container. The method can include the additional step of composting the insert after the step of removing the insert.

DRAWINGS

FIG. 1 is a perspective view of an insert having features of the present invention, the insert being positioned to be supported on an animal feed or watering bowl;

FIG. 2 is a front elevation view of the insert of FIG. 1;

FIG. 3 is a top plan view of the insert of FIG. 1;

FIG. 4 is a sectional elevational view of the insert of FIG. 1;

FIG. 5 is a perspective view as in FIG. 1, showing enlarged counterparts of the insert and the feed or watering bowl;

FIG. 6 is a front elevational view of the insert of FIG. 5;

FIG. 7 is a top plan view of the insert of FIG. 5;

FIG. 8 is a sectional elevational view of the insert of FIG. 5 on line 8-8 in FIG. 6;

FIG. 9 is a detail sectional view of the insert of FIG. 1 on line 9-9 in FIG. 3;

FIG. 10 is a detail sectional view of the insert of FIG. 1 on line 10-10 in FIG. 3;

FIG. 11 is a front elevational view showing a the insert of FIG. 1 positioned for support when lowered onto the insert of FIG. 5;

FIG. 12 is a top plan view of the inserts of FIGS. 1 and 5 positioned as shown in FIG. 11;

FIG. 13 is a sectional elevational view of the inserts of FIGS. 1 and 5 on line 13-13 of FIG. 11; and FIG. 14 is a process diagram showing a method for using the present invention.

DESCRIPTION

With reference to FIGS. 1-4, 9, and 10 of the drawings, an insert 10 for use with animal feed or watering container 12 having an upper edge 14 comprises a bowl-shaped body 16 having an open top 18 with an inside diameter D1 of from about 3.5 inches to about 8 inches. The body 16 has a rim 22 that preferably extends around the entire circumference of the open top 18. The rim 18 has a rim width RW that projects outwardly an amount at least sufficient to support the insert 10 on the upper edge 14 of the animal container 12. The rim 22 can be discontinuous, although it is preferably continuous as shown in the drawings for enhanced structural integrity and for evenly distributed support on the upper edge 14 of the container 12. The ratio of the rim width RW to the insert inside diameter D1 as measured in the plane of the rim 22 is at least 1:30. Preferably the rim width RW is between 0.25 inch and 0.75 inch.

Preferably a downwardly projecting lip 26 having an outwardly projecting flange 28 extends continuously around a perimeter of the insert 10 as further described below with reference to FIGS. 9 and 10.

There is at least one and preferably at least two tabs 24 extending radially outwardly from the rim 22 by a tab length TL for lifting the insert from the container. The tab length TL is at least 0.2 inch but preferably between 0.25 and 0.75 inch for stable support on containers 12 of various sizes. Preferably the two tabs 24 are diametrically opposed to each other as best shown in FIGS. 1 and 3.

The insert is made of a compostable material for facilitating environmentally responsible disposal following use.

By the term "compostable material" there is meant a material that satisfies AST Standard 6400 which is the "Standard Specification for Labeling of Plastics Designed to be Aerobically Composed in Municipal or Industrial Facilities." Although the standard refers to plastics, the definition is used herein to refer to all materials that are compostable.

Typically the tabs 24 each have a tab width TW that is from about 0.5 to about 1.5 inches as measured at the rim 22 and extend outwardly preferably from about 0.25 to about 0.75 inch.

It will be understood that there can be only one tab 24, as well as more than two of the tabs 24.

The depth of the insert 10 can correspond to the depth of the container 12. Typically the depth of the insert, designated BD as measured from the plane of the rim to the inside bottom of the body 16 as shown in FIG. 4 is from about 0.5 to about 4 inches. Correspondingly, a rim height RH from the underside of the rim 22 to the underside of the bowl 16 is also typically between 0.5 inch and 4 inches. Further, for enhanced structural integrity of the body 16, an upper third portion thereof has a side inclination angle A1 that preferably decreases from nearly vertical at the open top 18 to no more than 20 degrees from vertical, a middle third portion having a further decreasing inclination angle A2 being not less than 15 degrees and not more than 45 degrees from vertical as shown in FIG. 4. The body 16 has a generally flat bottom, an inside diameter D2 proximate the bottom being typically between 75 percent and 80 percent of the top inside diameter D1.

The tabs 24 extend outside of a rim outside diameter D3 of the rim 22 as indicated in FIG. 3, the rim 22 being further detailed in FIG. 9, the tabs 24 being further detailed in FIG. 10. More particularly, the rim 24 has a rim thickness TR, the lip 26 projects downwardly by a lip projection PW below the underside of the rim 22, and the flange 28 extends outwardly from the lip by a flange width FW, having a flange thickness FT. Preferably the lip projection LP is at least 0.06 inch, being spaced outwardly by a lip spacing LS of at least 0.2 inch beyond a clearance diameter surrounding the bowl-shaped body 16. The flange width FW is preferably between 0.04 inch and 0.08 inch, having a flange thickness FT that is between 0.015 inch and 0.030 inch, the rim thickness TR being substantially the same. As further detailed in FIG. 10, the tabs 24 are of corresponding construction, having a tab thickness TT that matches the rim thickness TR.

The insert 10 can be used stand alone as well as being supported on the container 12 as described above.

With further reference to FIG. 14, a method 100 for using the insert 10 includes a provide insert step 102, followed by a load edible step 104 in which food and/or liquid is put in the bowl 16 and, optionally, a seal edible step 106 wherein a suitable sheet material is removably sealingly applied to the rim 22 for protecting the edible. In a support insert step 108, the insert 10 is placed in the animal feed or watering container 22 with the insert 10 supported by the container upper edge 14 preferably contacting the rim 22 of the insert 10. In a remove seal step 110 the sheet material is removed for exposing the edible (if the optional seal edible step had been included) and the edible is available for consumption in a consumption of edible step 112. Thereafter, the insert is removed from the container 12 in a remove insert step 114, and preferably disposed of by composting in a compost insert step 116. It will be understood that the load edible step can follow the support insert step 108, particularly when the seal edible step 106 is not included.

Exemplary of a source of compostable bowls is World Centric located in Petaluma, Calif. 94953. Exemplary of compostable materials that can be used are corn starch, sugar cane chaff, wheat straw, plastics and paper. Compostable plastic typically is made of polylactic acid. Under a managed composting program, the product must 1) break down to carbon dioxide, water, inorganic compounds, and biomass at a rate similar to paper, 2) disintegrate into small pieces within 90 days, so that the original product is not visually distinguishable in the compost, and 3) leave no toxic residue. A discussion of compostable materials is provided by Mohini Sain et al in an articled titled, "Biodegradable Nanocomposites from Wheat Straw," AICHE, Annual Meeting, 2006.

With further reference to FIGS. 5-8 and 13, a somewhat enlarged counterpart of the insert, designated 10', includes counterparts of the body, designated 16', having the open top, designated 18' of inside diameter designated D1', the rim, designated 22', and the diametrically opposed tabs, designated 24'. Other dimensional aspects of the insert 10' generally correspond, slightly larger, to those of the insert 10 of FIGS. 1-4, in particular including the rib height, designated RH', the body depth, designated BD', the bottom depth, designated D2', the rim outside diameter, designated D3', the rim width, designated 22', the tab length, designated TL', and the tab width, designated TW'.

As shown in FIG. 13, the insert 10' can also function as the container 12 of FIG. 1, the rim 22' serving as a counterpart of the upper edge, being designated 14" in FIG. 13. The inserts 10 and 10' are shown slightly spaced apart for clarity, it being understood that the rim 12 of the insert 10 is to rest on the rim 22' of the insert 10', that rim serving as the upper edge 22' being also designated 14" in FIG. 3.

Although the present invention has been described in considerable detail with reference to certain preferred versions thereof, other versions are possible. For example, instead of or in addition to the rim to hold the insert in place, it can be sized to provide a tight fit or compression fit so that even turning the blow container with the insert therein upside down, the insert remains in the container. Therefore, the spirit and scope of the appended claims should not necessarily be limited to the preferred versions contained herein.

What is claimed is:

1. An insert for use with an animal feed or watering container having an upper edge, the insert comprising:
 a) a bowl-shaped body having an open top;
 b) an outwardly projecting rim around at least a sufficient portion of the open top for supporting the insert on the upper edge of the animal container, wherein the rim extends around the entire top;
 c) at least one tab extending radially outwardly from the rim by at least 0.2 inch for lifting the insert from the container; and
 d) a downwardly projecting lip extending fully around an outer perimeter of the insert for strengthening the rim and the tab, the lip being spaced outwardly from the bowl-shaped body by at least 0.2 inch beyond a clearance diameter surrounding the bowl-shaped body for projecting below a circular container upper edge,
 wherein the insert comprises a compostable material.

2. The insert of claim 1 wherein the width of the rim is between 0.25 inch and 0.75 inch.

3. The insert of claim 2 wherein the width of the rim is approximately 0.6 inch.

4. The insert of claim 1 comprising two tabs diametrically opposed.

5. The insert of claim 4 wherein each of the tabs has a width at the rim being at least 0.4 inch.

6. The insert of claim 5 wherein the width of each tab is between 0.5 and 1.5 inches.

7. The insert of claim 5 wherein each tab extends radially outwardly from the rim by a distance between 0.25 inch and 0.75 inch.

8. The insert of claim 1 wherein the body has an inside depth, an upper third-portion of the body having a side inclination of at least 70 degrees from vertical, a middle third portion of the body having a side inclination of between 15 degrees and 45 degrees from vertical for enhanced structural integrity of the body.

9. The insert of claim 1 wherein the lip projects downwardly at least 0.06 inch below the rim.

10. The insert of claim 1 further comprising an outwardly projecting flange extending fully around a bottom extremity of the lip for strengthening the lip.

11. The insert of claim 10 wherein the flange has a width of between 0.04 inch and 0.08 inch.

12. The insert of claim 1 further comprising an edible filling within the body, and a removable cover sealingly affixed to the rim for preserving the filling against contamination.

13. An animal feed or watering container having an upper edge, in combination with the insert of claim 1 being in the container, the upper edge of the container supporting the rim of the insert.

14. The insert of claim 13 wherein the tab has a width at the rim being at least 0.4 inch.

15. An insert for use with an animal feed or watering container having an upper edge,
 a) a bowl-shaped body having an open top having a diameter with a rim around at least a sufficient portion of the open top for supporting the insert on the upper edge of the animal container, the width of the rim being at least 0.25 inches and the diameter of the top being between 3.5 inches and 8.0 inches, wherein the rim extends around the entire top;
 b) at least one tab having a length extending radially outwardly from the rim of at least 0.2 inch for lifting the insert from the container, wherein the insert is made of a compostable material; and
 c) a downwardly projecting lip extending fully around an outer perimeter of the insert for strengthening the rim and the tab, the lip being spaced outwardly from the bowl-shaped body by at least 0.2 inch beyond a clearance diameter surrounding the bowl-shaped body for projecting below a circular container upper edge.

16. The insert of claim 15 wherein the width of the tab is between 0.5 and 1.5 inches.

17. The insert of claim 15 wherein the tab extends radially outwardly from the rim by a distance between 0.25 inch and 0.75 inch.

18. The insert of claim 15 wherein the width of the rim is between 0.25 inch and 0.75 inch.

19. The insert of claim 15 comprising two tabs diametrically opposed.

20. The insert of claim 15 further comprising an edible filling within the body, and a removable cover sealingly affixed to the rim for preserving the filling against contamination.

21. An animal feed or watering container comprising:
 a) a bowl-shaped body having an open top having an inside diameter of at least 3 inches and a rim around the open top for supporting an insert on the rim, the rim having a rim width of at least 1/30th of the inside diameter, wherein the rim extends around the entire top;
 b) at least one tab extending radially outwardly from the rim by at least 0.2 inch for lifting the container, wherein the container is made of a compostable material; and
 c) a downwardly projecting lip extending fully around an outer perimeter of the insert for strengthening the rim and the tab, the lip being spaced outwardly from the bowl-shaped body by at least 0.2 inch beyond a clearance diameter surrounding the bowl-shaped body for projecting below a circular container upper edge.

22. The insert of claim 21 wherein the width of the rim is between 0.25 inch and 0.75 inch.

23. The insert of claim 21 comprising two tabs diametrically opposed.

24. The insert of claim 21 further comprising an edible filling within the body, and a removable cover sealingly affixed to the rim for preserving the filling against contamination.

25. A method of providing food or liquid to an animal comprising the steps of:
 a) placing the insert of claim 1 in an animal feed or watering container with the insert supported by the container by the rim of the insert;
 b) placing food or liquid in the insert; and
 c) after step (b), removing the insert from the container.

26. The method of claim 25 comprising the additional step of composting the insert after step (c).

27. An insert for use with an animal feed or watering container having an upper edge, the insert comprising:
 a) a bowl-shaped body having an open top;
 b) an outwardly projecting rim around at least a sufficient portion of the open top for supporting the insert on the upper edge of the animal container, wherein the rim extends around the entire top;
 c) at least one tab extending radially outwardly from the rim by a sufficient distance from the rim for lifting the insert from the container; and
 d) a downwardly projecting lip extending fully around an outer perimeter of the insert for strengthening the rim and the tab, the lip being spaced outwardly from the bowl-shaped body by at least 0.2 inch beyond a clearance diameter surrounding the bowl-shaped body for projecting below a circular container upper edge,
 wherein the insert comprises a compostable material.

28. The insert of claim 27 wherein the width of the rim is between 0.25 inch and 0.75 inch.

29. The insert of claim 27 comprising two tabs diametrically opposed.

30. The insert of claim 27 further comprising an edible filling within the body, and a removable cover sealingly affixed to the rim for preserving the filling against contamination.

* * * * *